United States Patent [19]

Wu et al.

[11] Patent Number: 5,369,204
[45] Date of Patent: Nov. 29, 1994

[54] LOW MOLECULAR WEIGHT ACRYLAMIDOGLYCOLATE CROSSLINKER AND PROCESS

[75] Inventors: Kuang-Jong Wu, Shelton; Howard R. Lucas, Danbury; Robert G. Lees, Stamford; Nicholas J. Albrecht, Redding, all of Conn.

[73] Assignee: Cytec Technology Corp., Wilmington, Del.

[21] Appl. No.: 18,483

[22] Filed: Feb. 16, 1993

Related U.S. Application Data

[63] Continuation of Ser. No. 786,441, Nov. 1, 1991, abandoned.

[51] Int. Cl.$^5$ ................ C08F 20/58; C08F 214/18; C08F 214/02; C08F 220/42; C08F 220/54; C08F 218/02; C08F 220/28; C08F 212/06
[52] U.S. Cl. .................... 526/304; 526/242; 526/291; 526/297; 526/303.1; 526/319; 526/320; 526/347; 526/348
[58] Field of Search ............ 526/304, 242, 291, 297, 526/303.1, 319, 320, 347, 348

[56] References Cited

U.S. PATENT DOCUMENTS

| | | | |
|---|---|---|---|
| 3,422,139 | 1/1969 | Talet et al. | 260/584 |
| 4,454,301 | 6/1984 | Cady et al. | 525/118 |
| 4,521,563 | 6/1985 | Lucas | 524/555 |
| 4,522,973 | 6/1985 | Ley et al. | 524/555 |
| 4,530,960 | 7/1985 | Ley et al. | 524/555 |
| 4,554,337 | 11/1985 | Krinski et al. | 527/201 |
| 4,656,308 | 4/1987 | Schirmann et al. | 560/170 |
| 4,689,264 | 8/1987 | Fink et al. | 428/290 |
| 4,737,544 | 4/1988 | Roggero et al. | 526/83 |
| 4,743,498 | 5/1988 | Kedrowski et al. | 428/288 |
| 4,778,728 | 10/1988 | Lucas | 428/461 |
| 4,808,660 | 2/1989 | Schmeing et al. | 524/812 |
| 4,820,745 | 4/1989 | Muller et al. | 522/90 |
| 4,822,829 | 4/1989 | Muller et al. | 522/90 |
| 4,880,880 | 11/1989 | Chen | 525/163 |
| 4,902,569 | 2/1990 | Chen | 428/344 |

FOREIGN PATENT DOCUMENTS

| | | |
|---|---|---|
| 224736 | 6/1987 | European Pat. Off. . |
| 302588 | 2/1989 | European Pat. Off. . |
| 3613082 | 11/1986 | Germany . |

OTHER PUBLICATIONS

Proceedings of the ACS Division of Polymeric Materials: Science and Engineering, vol. 50, pp. 353–356 (1984).

Proceedings of the ACS Division of Polymeric Materials, Science and Engineering, vol. 55, pp. 315–321 (1986).

Proceedings of the Water-Borne Higher-Solids Coatings Symposium, vol. 16, pp. 505–520 (1989).

*Primary Examiner*—Joseph L. Schofer
*Assistant Examiner*—Wu C. Cheng
*Attorney, Agent, or Firm*—Bart E. Lerman; Michael J. Kelly; Claire M. Schultz

[57] ABSTRACT

Low molecular weight crosslinking agents useful in coatings based on esters of acrylamidoglycolate ethers are disclosed. The copolymeric crosslinking agents of the invention are prepared by copolymerizing a reactive acrylamidoglycolate monomer such as MAG-ME® methyl acrylamidoglycolate methyl ether with comonomers such as methyl methacrylate or butyl acrylate. The process of preparing the copolymeric crosslinkers of the invention makes use of chain transfer agents to limit the molecular weight of the crosslinking agents to 10,000 or less.

14 Claims, No Drawings

LOW MOLECULAR WEIGHT ACRYLAMIDOGLYCOLATE CROSSLINKER AND PROCESS

This application is a continuation of application Ser. No. 07/786.441 filed Nov. 1, 1991, now abandoned.

FIELD OF THE INVENTION

This invention relates to the preparation of low molecular weight polymeric and copolymeric acrylamidoglycolate crosslinkers such as MAGME® methyl acrylamidoglycolate methyl ether-based polymers and copolymers having utility in coatings.

BACKGROUND OF THE INVENTION

Polymers and copolymers of methyl acrylamidoglycolate methyl ether, commercially available under the trade name MAGME® 100 Multi-functional Monomer, and polymers and copolymers related to the MAGME® 100 monomer are described in U.S. Pat. Nos. 4,656,308; 4,778,728; 4,454,301; 4,521,563; 4,808,660; 4,689,264; 4,522,973; 4,743,498; 4,880,880; 4,554,337; 4,737,544; 3,422,139; European Patent Application Nos. 302,588 and 224,736; and Federal Republic of Germany Pat. No. 3,613,082. U.S. Pat. No. 4,454,301 in particular describes the use of acid or transesterification catalyst-cured systems. Sulfonic acids and tin salts are mentioned therein as examples of cure catalysts.

Other MAGME® copolymers having moderate (Mw about 30,000) molecular weights are disclosed in the proceedings of the ACS Division of Polymeric Materials Science and Engineering, Volume 55, page 315, 1986. Use of MAGME copolymers in coatings is described in the Proceedings of the Water-Borne Higher-Solids Coatings Sympoisum, Volume 16, page 505, 1989.

Polymers and copolymers of methyl acrylamidoglycolate methyl ether and related systems described above are high molecular weight polymers, and in some cases, such as in the case of latexes, emulsions, and dispersions, they are very high molecular weight polymers as described below.

The average molecular weights of polymers of methyl acrylamidoglycolate methyl ether exemplified in U.S. Pat. No. 4,454,301 are disclosed to be in the 54,000 to 70,000 range; polymers exemplified in U.S. Pat. No. 4,880,880 are in the 46,000 to 73,000 molecular weight range; polymers of unetherified methyl acrylamidoglycolate disclosed in European Patent Appl. No. 224,736 are said to range between about 500 to about 1,000,000, although higher molecular weights are said to be usable; in general, the latexes, the emulsions, and the dispersions comprise even higher molecular weight polymers.

This invention relates to very low molecular weight acrylamidoglycolate polymers and copolymers said very low molecular weight polymers having molecular weights of 10,000 or less. The use of said low molecular weight polymers and copolymers as crosslinkers in coil coatings is described in the copending applications submitted concurrently herewith entitled "Organotin Curable Composition and Coating Method", U.S. application Ser. No. 07/786,496 now abandoned; and "Acid Curable Composition and Method", U.S. application Ser. No. 07,786,442 now abandoned. The MAGME® based crosslinkers of the invention are typically combined with polyfunctional resins and are subsequently cured to form crosslinked coatings or articles. One of the important advantages of MAGME® based systems over the widely used amine-formaldehyde crosslinkers such as melamine based crosslinkers is that the MAGME® based crosslinkers do not produce formaldehyde by-product on cure.

SUMMARY OF THE INVENTION

This invention is a low molecular weight polymer or copolymer derived from alkyl acrylamidoglycolate alkyl ether repeating units and related compounds.

This invention is also a process for preparing said low molecular weight polymers and copolymers.

DETAILED DESCRIPTION OF THE INVENTION

The low molecular weight polyfunctional crosslinkers of this invention are polymers and co-polymers of ethers and esters of acrylamidoglycolic acid with unsaturated compounds having a plurality of the same or different segments represented by the formula:

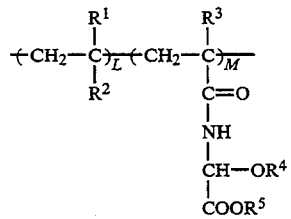

wherein L groups of the

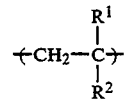

units are the same or different, and the $R^1$ and $R^2$ group in each of the L units are independently selected from a group consisting of hydrogen, carboxyl, cyano, chloro, fluoro, acyloxy, alkoxy, acetoxy, acyl, aminocarbonyl, N-alkylaminocarbonyl, N,N-dialkylaminocarbonyl, aryl, alkyl of 1 to 20 carbon atoms, aralkyl, alkoxycarbonyl of 1 to 20 carbon atoms, beta-hydroxyethoxycarbonyl, beta-hydroxypropoxycarbonyl, and gamma-hydroxypropoxy-carbonyl groups; and wherein M groups of the

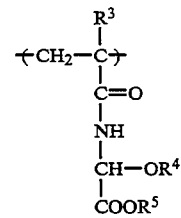

units are the same or different; and the $R^3$ group in each of the M units is independently selected from a group consisting of hydrogen, methyl, and phenol; and the $R^4$ and $R^5$ groups in each of the M units are independently selected from a group consisting of hydrogen, alkyl of 1 to 20 carbon atoms, alkoxyalkyl, aralkyl, perfluoro alkyl, and aryl groups; and wherein
L is from zero to about 100; and
M is from one to about 50;
with the proviso that the molecular weight of said crosslinker is 10,000 or less.

The preferred crosslinkers of the invention are those wherein the weight ratio of L groups of the

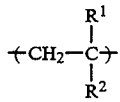

units to M groups of the

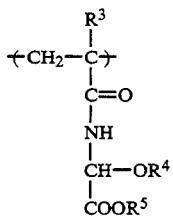

units in the crosslinker is from about 0.5:1 to about 10:1 and the weight percent of M groups of the

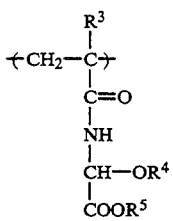

units in the crosslinker is from about 10 to about 66.

The low molecular weight crosslinkers of the invention contain at least two, preferably more than two

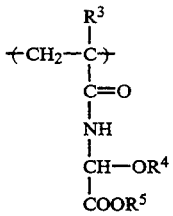

units, wherein each one of said units contains a pendently attached crosslinkingly reactive functional group such as an ether or an ester group, each unit being derived from a monomer represented by the formula:

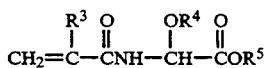

wherein $R^3$, $R^4$, and $R^5$ have the same meaning as defined above.

Suitable crosslinkingly reactive monomers include the following:
Methyl acrylamidoglycolate methyl ether (MAGME ®)
Butyl acrylamidoglycolate butyl ether (BAGBE)
Butyl acrylamidoglycolate methyl ether (BAGME)
Methyl acrylamidoglycolate buthyl ether (MAGBE)
Ethyl acrylamidoglycolate ethyl ether (EAGEE)
Propyl acrylamidoglycolate propyl ether (PAGPE)
Methyl methacrylamidoglycolate methyl ether (MMAGME)
Butyl methacrylamidoglycolate butyl ether (BMAGBE)
Methyl acrylamidoglycolate (MAG)
Ethyl acrylamidoglycolate (EAG)
Butyl acrylamidoglycolate (BAG)
Methyl methacrylamidoglycolate (MMAG)
Acrylamidoglycolic acid (AGA)
Methacrylamidoglycolic acid (MAGA)

Of the above monomers, methyl acrylamidoglycolate methyl ether is a commercial product of American Cyanamid Company, Wayne, N.J. available under the trade name as MAGME ® 100 Multi-functional Acrylic Monomer, and has the following properties:

| Appearance: | white solid |
|---|---|
| Melting Point (°C.): | 70–73 |
| Solubility (g/100 g solution) | |
| Methanol: | 40 |
| Methyl-Ethyl Ketone: | 32 |
| Water | 18 |
| Ethyl Acetate | 17 |
| Toluene | 3 |

The low molecular weight crosslinkers of the invention have molecular weights of 10,000 or less, and may contain

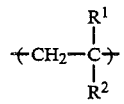

units, each one of said units being derived from a comonomer represented by the formula:

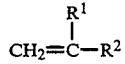

wherein $R^1$ and $R^2$ have the same meaning as defined above.

Suitable comonomers are selected without limitation from the following classes of mono-substituted or geminally disubstituted unsaturated compounds: alpha-olefins, vinylidenes, vinyl halides, vinylidene halides, vinyl carboxylates, vinyl ethers, alpha, beta-unsaturated aldehydes and ketones, styrenes, alpha-methyl styrenes, acrylic and methacrylic acid amides, acrylic and methacrylic nitriles, and acrylic and methacrylic acid esters. Suitable comonomers include the following unsaturated compounds: ethylene, propylene, isobutylene, 1-butene, 1-hexene, 1-octene, 2-methyl-1-hexene, 2-methyl-1-octene, methyenecyclohexane, methylene valerolactone, vinyl chloride, vinylidene chloride, vinyl acetate, hexyl vinyl ether, methyl vinyl ketone, acrolein, styrene, alpha-methylstyrene, para-methyl styrene, acrylamide, methacrylamide, acrylonitrile, methacrylonitrile, methyl acrylate, methyl methacrylate, ethyl acrylate, ethyl methacrylate, butyl acrylate, butyl methacrylate, ethylhexyl acrylate, ethylhexyl methacrylate, beta-hydroxyethyl acrylate, beta-hydroxyethyl methacrylate and beta-and gamma-hydroxypropyl acrylate and methacrylate. Of the suitable comonomers mentioned above, butyl acrylate and methyl methacrylate are preferred.

The crosslinker described in this invention is a low molecular weight acrylamidoglycolate polymer crosslinker derived from polymerization of:

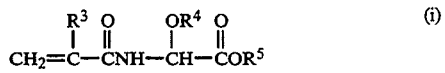

wherein $R^3$ is selected from the group consisting of hydrogen, methyl, and phenyl; and $R^4$ and $R^5$ are independently selected from the group consisting of hydrogen, alkyl of 1 to 20 carbon atoms, alkoxyalkyl, aralkyl, perfluoroalkyl, and aryl groups; and optionally

wherein $R^1$ and $R^2$ are the same or different and are independently selected from the group consisting of hydrogen, carboxyl, cyano, chloro, fluoro, acyloxy, alkoxy, acetoxy, acyl, aminocarbonyl, N-alkylaminocarbonyl, N,N-dialkylaminocarbonyl, aryl, alkyl of 1 to 20 carbon atoms, aralkyl, alkoxycarbonyl of 1 to 20 carbon atoms, beta-hydroxyethoxycarbonyl, beta-hydroxypropoxycarbonyl groups.

The weight ratio of (ii) to (i) is form 0.5:1 to about 10:1 and the weight percent of (i) in the polymer is from about 10 to about 66.

The molecular weight of the crosslinker of the invention is 10,000 or less and is derived either from homopolymerization of (i) or from copolymerization of (i) and (ii).

The low molecular weight crosslinkers of the invention may be terminated by the same or different terminal groups at each end of each polymeric cross-linker molecule, said terminal groups being selected from hydrogen, halogen, alkyl, cyanoalkyl, aryl, 2-hydroxyethylmercapto, tertiary-alkylmercapto, tertiary-alkoxy, and acyloxy groups. The terminal groups in the crosslinker chains are generally derived from the free radical initiator or chain transfer agents employed in the preparation of the polymers and do contribute only slightly to the overall composition in the case of polymers of prior art very high molecular weight. In contrast, the contribution of the terminal groups to the overall composition can be substantial in the case of low molecular weight polymers, and particularly in the case of the very low molecular weight polymers of the type described in this invention. Because of the inverse relationship between the weight percent of the terminal groups in a polymer and the molecular weight of the polymer containing said terminal groups, the contribution of the terminal groups increases as the molecular weight of the polymer decreases, such that the unique properties of the terminal groups are imparted to the polymers which are characterized and made distinct by the presence of said properties.

For example, the very low molecular weight 2-hydroxyethylmercapto terminated crosslinkers of this invention are capable of substantial self-crosslinking to produce cured films with or without additional resins, whereas similar high molecular weight polymers, such as those of the prior art, always require the presence of externally added polyfunctional resins to produce cured films. The unique properties of the crosslinkers of this invention are due not only to the low molecular weight of the crosslinkers themselves, but they are due as well to the chain transfer agent derived hydroxy functional terminal groups present in said crosslinkers.

The low molecular weight crosslinkers of this invention also have lower glass transition temperatures than analogous high molecular weight systems and as a result are able to maintain some mobility at lower temperatures leading to more crosslinking and hence superior film properties of the cured films. Furthermore, the low molecular weight crosslinkers are more compatible with the resin with which they react and, as a result, produce more uniform films with more extensive crosslinking. Finally, the low molecular weight crosslinkers are of lower viscosity which enables the use of higher solids compositions which in turn leads to lower volatile organic compound (VOC) emissions in large scale coating processes.

PREPARATION OF THE CROSSLINKERS

The low molecular weight crosslinkers of this invention are prepared by a process comprising the sequential steps of:
(A) preparing a reactor charge solution by adding reactor charge materials comprising:
  (i) a polymerizable, crosslinkably reactive monomer,
  (ii) an unsaturated comonomer,
  (iii) a liquid medium,
  (iv) a chain transfer agent, and
  (v) a free radical initiator;
(B) introducing the reactor charge of step (A) into a reaction zone containing a liquid medium; and
(C) maintaining the reaction zone of step (B) containing reactor charge (A) at a temperature and for a length of time sufficient to polymerize at least 95 weight percent of the monomers.

The polymerizable, crosslinkingly reactive monomer (i) is represented by the formula:

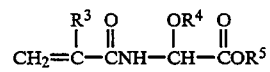

wherein $R^3$ is selected from a group consisting of hydrogen, methyl, and phenyl; and $R^4$ and $R^5$ are each independently selected from a group consisting of hydrogen, alkyl of 1 to 20 carbon atoms, alkoxyalkyl, aralkyl, dialkylamino, perfluoroalkyl and aryl groups. The preferred monomers are methyl acrylamidioglycolate methyl ether and butyl acrylamidoglycolate, butyl ether. The unsaturated comonomer (ii) is represented by the formula:

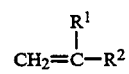

wherein $R^1$ and $R^2$ are each independently selected from a group consisting of hydrogen, carboxyl, cyano, fluoro, acyloxy, chloro, alkoxy, acetoxy, acyl, aminocarbonyl, N-alkyl-aminocarbonyl, N,N-dialkylaminocarbonyl, aryl, alkyl of 1 to 20 carbon atoms, aralkyl, alkoxycarbonyl of 1 to 20 carbon atoms, beta-hydroxyethoxycarbonyl, beta-hydroxypropoxycarbonyl, and gamma-hydroxypropoxycarbonyl groups. The preferred comonomers are methyl methacrylate, butyl acrylate, and mixtures thereof.

The liquid medium (iii) usable in the reactor charge is a solvent selected from a group consisting of alcohols, ketones, ethers, esters, nitriles, aliphatic hydrocarbons, aromatic hydrocarbons, halogenated hydrocarbons, and mixtures thereof. Of these solvents, toluene and methyl ethyl ketone are preferred.

The chain transfer agent (iv) usable in the process of the invention is typically an alkyl or aryl mercaptan although other chain transfer agents are also usable. The preferred mercaptan is selected from a group consisting of tertiary dodecyl mercaptan, primary dodecyl mercaptan, secondary dodecyl mercaptan, primary butyl mercaptan, secondary butyl mercaptan, tertiary butyl mercaptan, and 2-mercaptoethanol. The 2-mercapto-ethanol chain transfer agent is particularly preferred in cases where hydroxy terminated crosslinkers are desirable. The concentration of the chain transfer agent in the reactor charge is from about 0.001 to about 10 weight percent.

The free radical initiator (v) in the reactor charge is selected from the group consisting of hydroperoxides, peresters, alkyl peroxides, acyl peroxides, percarbonates, and azobisnitriles. Of these, peresters are preferred, tertiary butyl peroctoate and tertiary amylperoctoate being the most preferred free radical initiators.

The molecular weight of the polymer can be controlled by controlling the radical initiator and chain transfer agent concentrations such that, when lower levels of either or both are employed, higher molecular weight polymers are obtained. In an opposite sense, when lower molecule weight polymers are desired, higher levels of either or both reagents are used.

The temperature of the reaction zone is from about 20° C. to about 150° C. Selection of a specific temperature depends on the half-life, at said selected temperature, of the free radical initiator chosen for the process. In the preferred peroctoate initiator case, a temperature of 82° C. is preferred.

The polymerization time of itself is not critical, and may vary from about 30 minutes to as much as 24 hours. It is critical, however, to allow sufficient time to polymerize at least 95 weight percent, and preferably more than 95 weight percent of the monomers and comonomers of the reaction charge.

The ratio of the monomer (i) to comonomer (ii) in the reactor charge is not critical and depends on the composition desired for the crosslinker. To prepare the preferred low molecular weight crosslinkers of this invention, a monomer (i)/comonomer (ii) weight ratio of from about 1:0.5 to about 1:10 is preferred.

The concentration of the liquid medium (iii) in the reactor charge is preferably from about 20 weight percent to about 80 weight percent, and the ratio of the liquid medium (iii) to total remaining ingredients (i), (ii), (iv), and (v) of the reactor charge is preferably from about 0.25 to about 4.0.

The low molecular weight crosslinkers of this invention may be further purified or may be used in the unpurified state. Furthermore, the reaction product may be concentrated by removing volatiles by evaporation or distillation to achieve a desired solids level or viscosity.

The polymeric and copolymeric products prepared by the process of this invention are usable as the low molecular weight crosslinkers in curable compositions for coatings, adhesives, and molding compounds. They may be advantageously used in appliance, wood, can, coil, and exterior coating. They are particularly useful in coil coatings applications.

EXAMPLE 1

Preparation of Crosslinker A

| PREPARATION OF CROSSLINKER A | |
|---|---|
| Methyl Acrylamidoglycolate Methyl Ether Charge (g): | 63.9 |
| (as mole % of total monomers charged): | 33 |
| Butyl Acrylate Charge (g) | 96.1 |
| (as mole % of total monomers charged): | 67 |
| Solvents (g): | |
| Toluene: | 144 |
| Methyl Ethyl Ketone | 96 |
| Total Solvents | 240 |
| Monomers (percent of total charge) | 39.2 |
| Total Monomers/Total Solvents Weight Ratio | 0.66 |
| Tert-Butyl Peroctoate Initiator (g) | 3.2 |
| 2-Mercaptoethanol Chain Transfer Agent (g) | 4.8 |

A mixture of toluene (14.4 g) and methyl ethyl ketone (9.6 g) was added to a 500 ml. three necked flask. After sparging with nitrogen (about 20 min), the contents of the flask were heated to 82° C. A solution of toluene (129.6 g), methyl ethyl ketone (86.4 g), methyl acrylamidoglycolate methyl ether (63.9 g) butyl acrylate (96.1 g), tert-butyl peroctoate (3.2 g), and 2-mercaptoethanol (4.8 g) was added slowly over a 4.5 hour period. After the addition, heating at 82° C. was continued for an additional 4 hours for completion of the polymerization reaction and then cooled to room temperature to give crosslinker A having the following physical properties:

| Molecular Weight (Weight Average by GPC): | 4,426 |
|---|---|
| Polydispersity (by GPC): | 1.66 |
| Percent Solids (Foil Method): | 40.4 |

This Example illustrates the preparation of Crosslinker A.

EXAMPLE 2

Preparation of Crosslinker B

| PREPARATION OF CROSSLINKER B | |
|---|---|
| Methyl Acrylamidoglycolate Methyl Ether Charge (g): | 73.6 |
| (as mole % of total monomers charged): | 33 |
| Methyl Methacrylate Charge (g) | 86.4 |
| (as mole % of total monomers charged): | 67 |
| Solvents (g): | |
| Toluene | 144 |
| Methyl Ethyl Ketone | 96 |
| Total Solvents | 240 |
| Monomers (as percent of total charge) | 39.2 |
| Total Monomer/Total Solvent Weight Ratio | 0.66 |
| tert-Butyl Peroctoate Initiator (g) | 3.2 |
| 2-Mercaptoethanol (g) | 4.8 |

The procedure of Example 1 was followed using methyl methacrylate instead of butyl acrylate to give crosslinker B having the following physical properties:

| Molecular Weight (Weight Average by GPC): | 8,323 |
|---|---|
| Polydispersity (by GPC): | 2.09 |

This Example illustrates the preparation of Crosslinker B.

EXAMPLE 3

Preparation of Crosslinker C

Crosslinker C was prepared by combining Crosslinker A of Example 1 (23.5 g) and Crosslinker B of Example 2 (20.0 g) to produce 43.5 g of Crosslinker C.

This Example illustrates the blending of Cross-linkers A and B to obtain Crosslinker C.

Although the present invention has been described with reference to certain preferred embodiments, it is apparent that modifications and variations thereof may be made by those skilled in the art without departing from the scope of this invention as defined by the appended claims.

We claim:

1. A low molecular weight crosslinker having a plurality of the same or different segments represented by the formula:

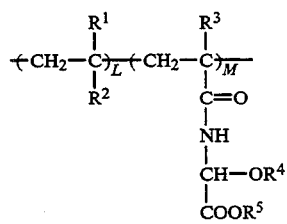

wherein L groups of the

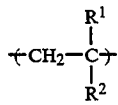

units are the same or different, and the $R^1$ and $R^2$ groups in each of the L units are independently selected from a group consisting of hydrogen, fluoro, acyloxy, carboxy, cyano, chloro, alkoxy, acetoxy, acyl, aminocarbonyl, N-alklyaminocarbonyl, N,N-dialkylaminocarbonyl, aryl, alkyl or 1 to 20 carbon atoms, aralykl, alkoxycarbonyl of 1 to 20 carbon atoms, beta-hydroxyethoxycarbonyl, beta-hydroxypropoxycarbonyl, and gamma-hydroxypropoxycarbonyl groups; and wherein M groups of the

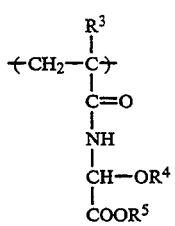

units are the same or different; and the $R^3$ group in each of the M units is independently selected from a group consisting of hydrogen, methyl, and phenyl; and the $R^4$ and $R^5$ groups in each of the M units are independently selected from a group consisting of hydrogen, alkyl of 1 to 20 carbon atoms, alkoxyalkyl, aralkyl, perfluoroalkyl, and aryl groups; and wherein L is from zero to about 100; and M is from one to about 50;

with the proviso that the crosslinker has a weight average molecular weight of 10,000 or less.

2. The crosslinker of claim 1 wherein $R^3$ is hydrogen and $R^4$ and $R^5$ are both methyl.

3. The crosslinker of claim 2 wherein $R^1$ is hydrogen and $R^2$ is normal butoxycarbonyl.

4. The crosslinker of claim 2 wherein $R^1$ is methyl and $R^2$ is methoxycarbonyl.

5. The crosslinker of claim 4 wherein the weight ratio of L groups of the

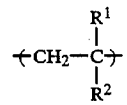

units to M groups of the

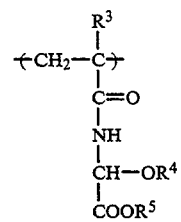

units in the crosslinker is from about 0.5:1 to about 10:1.

6. The crosslinker of claim 4 wherein the weight percent of M groups of the

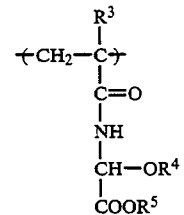

units in the crosslinker is from about 10 to about 66.

7. A low molecular weight acrylamidoglycolate polymer crosslinker derived from the copolymerization of:

wherein $R^3$ is selected from the group consisting of hydrogen, methyl, and phenyl; and $R^4$ and $R^5$ are independently selected from the group consisting of hydrogen, alkyl of 1 to 20 carbon atoms, alkoxyalkyl, aralkyl, perfluoroalkyl, and aryl groups; and $$CH_2=\overset{R^1}{\underset{}{C}}-R^2 \qquad (ii)$$

wherein $R^1$ and $R^2$ are the same or different and are independently selected from the group consisting of hydrogen, carboxyl, cyano, chloro, fluoro, acyloxy, alkoxy, acetoxy, acyl, aminocarbonyl, N-alkaminocarbonyl, N,N-dialkylaminocarbonyl, aryl, alkyl of 1 to 20 carbon atoms, beta-hydroxyethoxycarbonyl, and gamma-hydroxypropoxycarbonyl groups, wherein the crosslinker has a weight average molecular weight of 10,000 or less. pg,22

8. The crosslinker of claim 7 wherein $R^3$ is hydrogen and $R^4$ and $R^5$ are both methyl.

9. The crosslinker of claim 8 wherein $R^1$ is hydrogen and $R^2$ is normal butoxycarbonyl.

10. The crosslinker of claim 8 wherein $R^1$ is methyl and $R^2$ is methoxycarbonyl.

11. The crosslinker of claim 10 wherein the weight ratio of (ii) to (i) is from about 0.5:1 to about 10:1.

12. The crosslinker of claim 10 wherein the weight percent of (i) in the polymer is from about 10 to about 66.

13. A low molecular weight acrylamidoglycolate polymer crosslinker derived from the homopolymerization of:

$$CH_2=\overset{R^3}{\underset{|}{C}}-\overset{O}{\underset{||}{C}}NH-\overset{OR^4}{\underset{|}{C}H}-\overset{O}{\underset{||}{C}}OR^5 \qquad (i)$$

wherein $R^3$ is selected from the group consisting of hydrogen, methyl, and phenyl; and $R^4$ and $R^5$ are independently selected from the group consisting of hydrogen, alkyl of 1 to 20 carbon atoms, alkoxyalkyl, aralkyl, perfluoroalkyl, and aryl groups; wherein the crosslinker has a weight average molecular weight of 10,000 or less.

14. The crosslinker of claim 13 wherein $R^3$ is hydrogen and $R^4$ and $R^5$ are both methyl.

* * * * *